(12) United States Patent
Kim

(10) Patent No.: US 7,824,794 B2
(45) Date of Patent: Nov. 2, 2010

(54) BATTERY HAVING SIMPLIFIED ARRANGEMENT FOR INSULATING ELECTRODE ASSEMBLY

(75) Inventor: Hyun-Seok Kim, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 969 days.

(21) Appl. No.: 11/288,085

(22) Filed: Nov. 29, 2005

(65) Prior Publication Data

US 2006/0115722 A1    Jun. 1, 2006

(30) Foreign Application Priority Data

Nov. 30, 2004    (KR)    ................ 10-2004-0099310

(51) Int. Cl.
*H01M 2/26*    (2006.01)
*H01M 2/14*    (2006.01)
*H01M 2/16*    (2006.01)
*H01M 2/06*    (2006.01)

(52) U.S. Cl. .................. 429/161; 429/211; 429/246; 429/254; 429/178

(58) Field of Classification Search .............. 429/161, 429/211, 246, 254, 178
See application file for complete search history.

(56) References Cited

U.S. PATENT DOCUMENTS

2004/0191612 A1 *    9/2004    Akita et al. .................. 429/94

FOREIGN PATENT DOCUMENTS

| JP | 2000-40501 | | 2/2000 |
|---|---|---|---|
| JP | 2000-040501 | * | 2/2000 |
| JP | 2000-150306 A | | 5/2000 |
| JP | 2004-303500 A | | 10/2004 |

* cited by examiner

*Primary Examiner*—Dah-Wei Yuan
*Assistant Examiner*—Angela J. Martin
(74) *Attorney, Agent, or Firm*—Lee & Morse, P.C.

(57) ABSTRACT

A battery including an electrode assembly having a positive electrode, a negative electrode and a separator interposed between the electrodes, a container housing the electrode assembly, a tab attached to a first side of an uncoated region of the electrode assembly, the tab having a terminal, a first insulator interposed between the tab and a first inner surface of the container, and a cap assembly closing the container and having the terminal passing therethrough.

26 Claims, 7 Drawing Sheets

BATTERY HAVING SIMPLIFIED ARRANGEMENT FOR INSULATING ELECTRODE ASSEMBLY

BACKGROUND OF THE INVENTION

1. Field of the Invention

The present invention relates to a battery. More particularly, the present invention relates to a battery with a structure that simplifies insulating between a container and an electrode assembly inside the container.

2. Description of the Related Art

Generally, a primary battery is not rechargeable, i.e., is deposable. A secondary battery, in contrast, may be recharged. Non-aqueous electrolyte secondary batteries of high energy density have recently been developed as high power secondary batteries. Low power batteries, in which one battery cell is made into a battery pack, may be used to power various portable electronic devices, e.g., cellular phones, laptop computers, camcorders, etc. High power, bulk size batteries may be used for drive motors, e.g., electric motors used in electric vehicles. In these high power batteries, several individual secondary battery cells, to tens of individual secondary battery cells, may be connected in series or in parallel.

Secondary batteries may be classified into different types depending on the external shape of the battery. Two common types of secondary batteries are prismatic-type and cylindrical-type batteries.

A secondary battery may include an electrode assembly. The electrode assembly may include a positive electrode and a negative electrode, which may each have a long, belt-like shape, i.e., a ribbon shape. The electrode assembly may also include a separator, which serves as an insulator interposed between the positive and negative electrodes. The positive electrode, separator and negative electrode may be spiral-wound. Alternatively, the positive electrode, the separator and the negative electrode may be stacked in a multiple layer structure. The electrode assembly is typically housed inside a container, and a cap assembly is mounted on the container to seal the container and complete the battery.

In further detail, where the electrode assembly has a wound structure, leads may be individually fixed to the positive and negative electrodes to collect current generated therefrom. The leads may be connected to external terminals and carry the current generated at the positive and negative electrodes to the external terminals.

For bulk size batteries, e.g., those used for motor driven devices such as hybrid electric vehicles (HEVs), the area of the positive and negative electrodes generally increases as the size of the battery increases. This may result in increased resistance within the battery and, thus, bulk size batteries may include a separate tab to maximize the collecting area and lower the resistance. In particular, uncoated regions of the respective electrodes may be connected with the terminals using the tab.

However, such a structure may require an additional process for wrapping the electrode assembly with an insulating film, in order to prevent electrical contact between the tab and the container, or between the electrode assembly and the container. Wrapping the electrode assembly adds complexity to the manufacturing process and makes the process more costly due to insulating film consumption, increased manufacturing time, etc. Accordingly, there is a need for a simplified battery structure that does not require wrapping the electrode assembly with an insulating film.

SUMMARY OF THE INVENTION

The present invention is therefore directed to a battery, which substantially overcomes one or more of the problems due to the limitations and disadvantages of the related art.

It is therefore a feature of an embodiment of the present invention to provide a battery in which a tab structure is connected to an uncoated region of an electrode assembly to electrically insulate the tab from a container.

It is therefore another feature of an embodiment of the present invention to provide a battery in which a tab mounted on an uncoated region of an electrode assembly carries current from the electrode assembly to an external region of a battery container while also insulating the electrode assembly from the battery container.

It is therefore a further feature of an embodiment of the present invention to provide a battery in which an electrode assembly can be disposed in a battery container without requiring the electrode assembly to be wrapped in an insulating film.

At least one of the above and other features and advantages of the present invention may be realized by providing a battery, including an electrode assembly including a positive electrode, a negative electrode and a separator interposed between the electrodes, a container housing the electrode assembly, a tab attached to a first side of an uncoated region of the electrode assembly, the tab having a terminal, a first insulator interposed between the tab and a first inner surface of the container, and a cap assembly closing the container and having the terminal passing therethrough.

The first insulator may be a coating applied to a surface of the tab that faces the first inner surface of the container. The first insulator may also be coated on a side surface of the tab. The first insulator may not be coated on a portion of the surface of the tab that faces the first inner surface of the container, such that the portion of the surface of the tab is exposed. The uncoated region of the electrode assembly and the tab may be welded together, the weld corresponding to the exposed portion of the tab. The exposed portion of the tab may have a long shaft like shape along the length direction of the tab. The first insulator may be made of polymer or polypropylene.

The first insulator may be a separate member that is attached to a surface of the tab that faces the first inner surface of the container. The tab may include a binding portion, and the first insulator may have a width that is larger than a width of the binding portion. The first insulator may have a substantially planar shape and may have an opening to expose a portion of the surface of the tab. The opening may have a long shaft like shape along the length direction of the tab. The uncoated region of the electrode assembly and the tab may be welded together, the weld corresponding to the portion of the tab exposed through the opening in the first insulator.

The battery may further include an auxiliary tab, wherein the auxiliary tab is attached to a second side of the uncoated region, opposite the first side, and a second insulator interposed between the auxiliary tab and a second inner surface of the container. The battery may include, in sequence, the first inner surface of the container, the first insulator, the tab, the electrode assembly, the auxiliary tab, the second insulator, and the second inner surface of the container. The second insulator may be a coating applied to a surface of the auxiliary tab that faces the second inner surface of the container. The second insulator may also be coated on a side surface of the auxiliary tab. The second insulator may not be coated on a portion of the surface of the auxiliary tab that faces the second inner surface of the container, such that a portion of the surface of the auxiliary tab is exposed. The uncoated region of the electrode assembly and the auxiliary tab may be welded together, the weld corresponding to the exposed portion of the auxiliary tab. The second insulator may be made of polymer or polypropylene. The second insulator may be a separate member attached to the surface of the auxiliary tab that faces the second inner surface of the container. The second insulator may have a substantially planar shape and may have an opening to expose a portion of the surface of the auxiliary tab. The opening may have a long shaft like shape along the length direction of the auxiliary tab. The uncoated region of the electrode assembly and the auxiliary tab may be welded through the surface of the auxiliary tab exposed through the opening of the insulator. The tab may cover the entire area of the first side of the uncoated region. The battery may be a secondary prismatic type battery. The battery may be used for a motor driven device.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
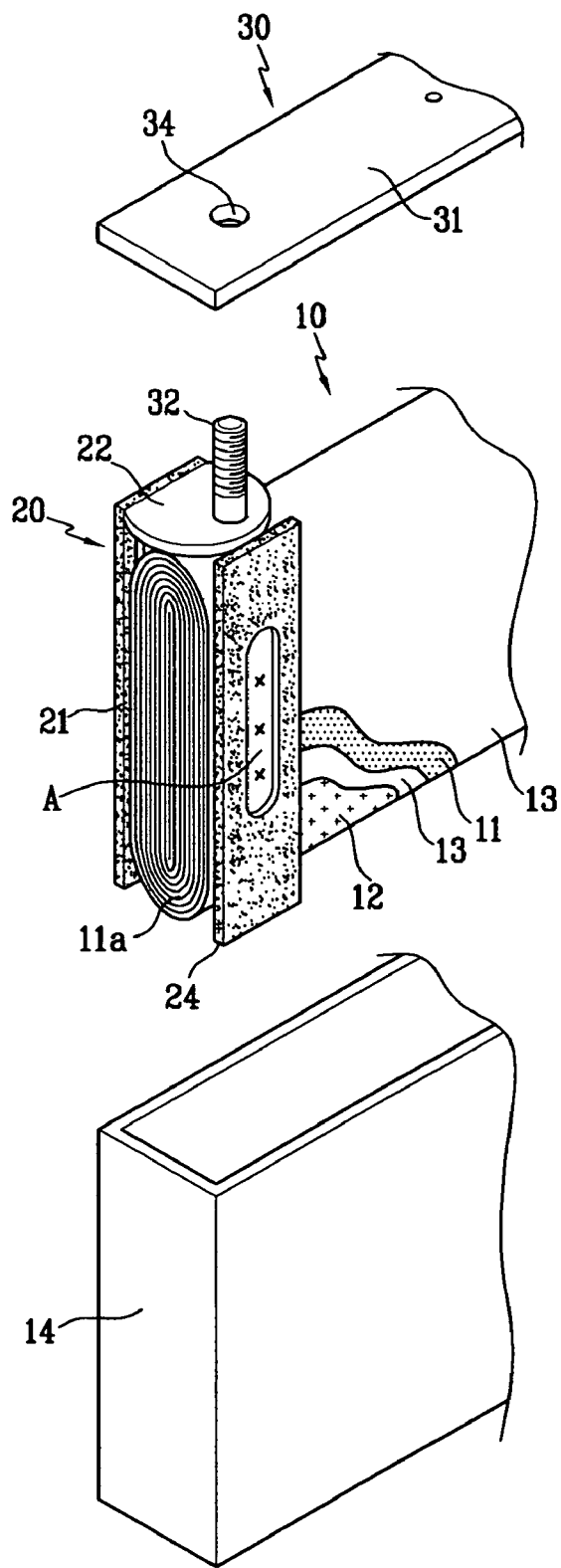
FIG. 1 illustrates a partial cut-away exploded perspective view of a battery according to the present invention.

Korean Patent Application No. 10-2004-0099310, filed on Nov. 30, 2004, in the Korean Intellectual Property Office, and entitled: "Secondary Battery," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration. It will also be understood that when a layer is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
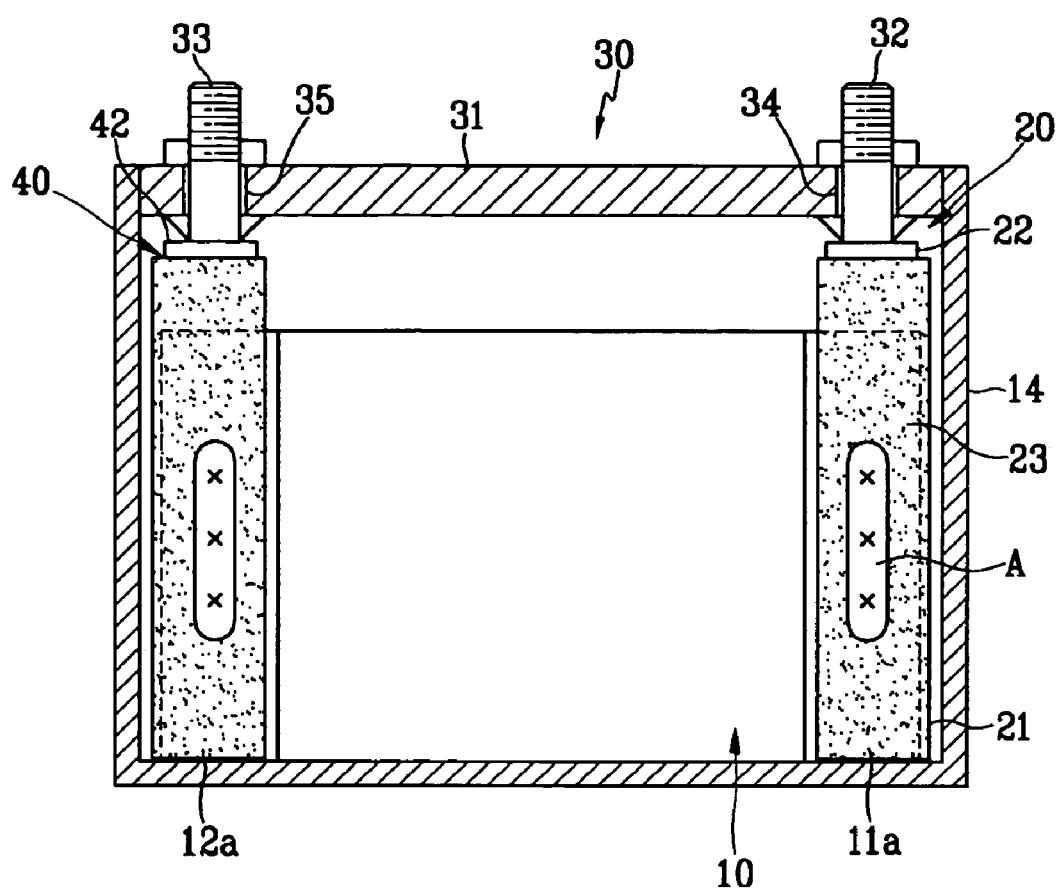
FIG. 2 illustrates a cross-sectional view of assembled battery according to the present invention.
Figure 3:
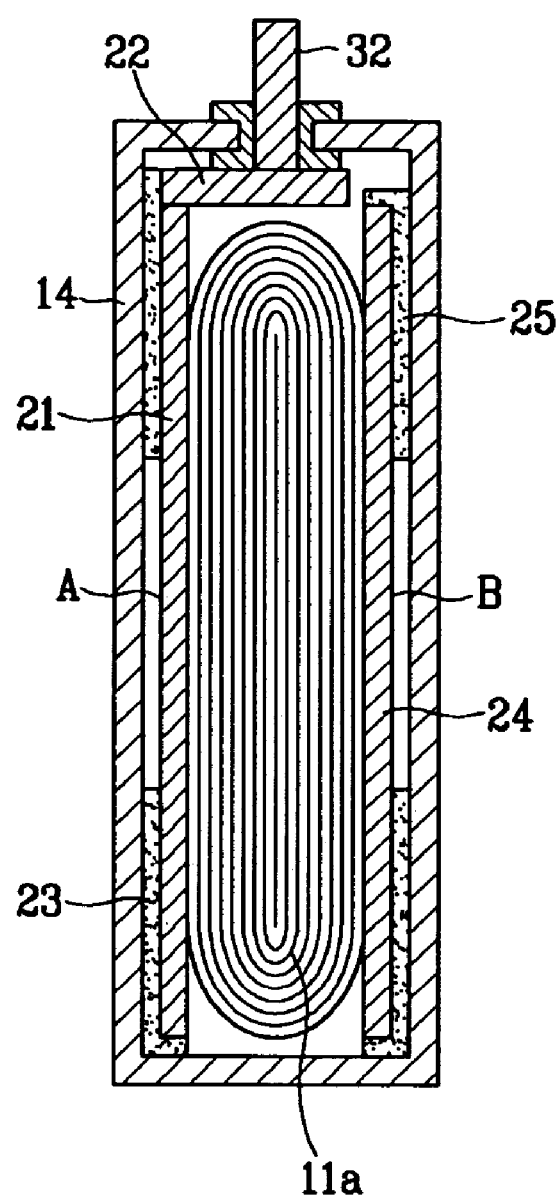
FIG. 3 illustrates a cross-sectional side view of the assembled battery illustrated in FIG. 2.

FIG. 1 illustrates a partial cut-away exploded perspective view of a battery according to the present invention, FIG. 2 illustrates a cross-sectional view of assembled battery according to the present invention, and FIG. 3 illustrates a cross-sectional side view of the assembled battery illustrated in FIG. 2. For clarity, FIGS. 1 and 3 illustrate only the positive electrode end of a battery according to the present invention. However, it is understood that the positive electrode end, the negative electrode end, or both, may have the illustrated structure.

Referring to FIG. 1, a battery according to the present invention may include an electrode assembly 10 housed within a container 14 and covered by a cap assembly 30. The container 14 may be a prismatic type container having an opening formed on one of its sides to receive the electrode assembly 10. The container 14 may be made of, e.g., a conductive metal such as aluminum, aluminum alloy, steel plated with nickel, etc. The shape of the container 14 may be, e.g., a hexahedron, etc., having an inner space to receive the electrode assembly 10.

The cap assembly 30 may close off and seal the container 14. The cap assembly 30 may include a cap plate 31 for mounting on the opening of the container 14 to seal the container 14, and may include terminal holes 34 and 35.

The electrode assembly may include a positive electrode 11 and a negative electrode 12, wherein a separator 13 is interposed between the electrodes 11, 12. The positive and negative electrodes 11, 12, may each have a long, belt-like shape, i.e., a ribbon shape. The positive and negative electrodes 11, 12, having the separator 13 interposed therebetween, may be wound in an elongated spiral shape, also known as a jellyroll, such that the electrodes and separator have a multi-layered, or stacked structure.

Referring to FIG. 1, the electrode assembly 10 having the jellyroll configuration may be pressed and flattened, and thus may include a flat central portion having a generally planar aspect, and curved edge portion having a generally round shape. The electrode assembly may be inserted into a prismatic container 14 such that a curved portion faces the opening in the side of the container 14, although the present invention is not limited to this arrangement.

The collectors of the positive electrode 11 and the negative electrode 12 may be coated with corresponding active materials. In particular, the positive electrode 11 and the negative electrode 12 of the electrode assembly 10 may include a collector, a coated region that is coated with an active material, and an uncoated region that is not coated with the active material. In an embodiment, the uncoated regions, e.g., uncoated region 11a in FIG. 1, may each be continuously formed along an edge of each electrode. The uncoated regions may be disposed opposite to each other, i.e., at respective ends of the electrode assembly 10.

A tab 20 may be attached, to an uncoated region 11a of the positive electrode 11, e.g., by welding a binding portion 21 of the tab 20 to the uncoated region 11a of the positive electrode 11. An insulator 23 may be disposed adjacent to the binding portion 21. The insulator 23 may be made of, e.g., a polymer, polypropylene, etc. An area (A) of the binding portion 21 may not be covered by the insulator 23 and may be used for welding the binding portion 21 to the uncoated region 11a. The tab 20 may have a terminal 32 formed at one end and supported by a connecting part 22, the terminal 32 disposed to extend toward the opening of the container 14. The terminal 32 may pass through the terminal hole 34 formed in the cap plate 31, so as to carry current to the exterior of the container 14. An auxiliary tab 24 may also be attached to an opposite face of the uncoated region 11a of the positive electrode 11.

Referring to FIG. 2, a similar structure may be included at the other end of the battery. That is, a tab 40 may be welded to an uncoated region 12a of the negative electrode 12, and may have a terminal 33 formed at one end and supported by a connecting part 42. The terminal 31 may be disposed to extend toward the opening of the container 14 and may pass through the terminal hole 35 formed in the cap plate 31.

As described, the uncoated regions 11a and 12a may be electrically connected to the tabs 20 and 40, respectively, and may be formed along one edge of each of the electrodes 11 and 12 of the electrode assembly 10. In further detail, the uncoated region 11a of the positive electrode 11 and the uncoated region 12a of the negative electrode 12 may disposed at opposing ends of the electrode assembly 10. Where, as illustrated, the spirally wound electrode assembly 10 is inserted into the container 14 such that a curve portion of the electrode assembly 10 faces the opening in a first side of the container 14, the uncoated regions 11a and 12 may be disposed along second and third sides of the container 14, respectively.

That is, as illustrated in FIG. 2, where the container 14 is oriented vertically, such that the opening in the container 14 is at the top and the cap assembly 30 covers the top, the uncoated regions 11a and 12a may be disposed along the right and left sides of the container 14, respectively. The positive terminal 32 may be disposed toward one side of the container, e.g., the right side, and may be electrically connected to the positive electrode 11 by way of a major surface of the tab 20 being welded to the uncoated region 11a. Similarly, the negative terminal 33 may be disposed toward the other side of the container, e.g., the left side, and may be electrically connected to the negative electrode 12 by way of a major surface of the tab 40 being welded to the uncoated region 12a. Note, however, that the present invention is not limited to the above-described structure, and may be suitably applied to other types of batteries having various shapes of containers and having various structures for the uncoated regions.

FIG. 3 illustrates a cross-sectional side view of the assembled battery illustrated in FIG. 2. Referring to FIG. 3, the terminal 32, the connecting portion 22 and the binding portion 21 may be integrally formed. As illustrated, the connecting portion 22 may extend downward and may be disposed adjacent to a side surface of the uncoated region 11a of the positive electrode 11.

The binding portion 21 may substantially cover one side surface of the positive uncoated region 11a. A side of the binding portion 21 may be disposed adjacent to an interior surface of the housing 14. In order to prevent the binding portion 21 from electrically contacting the housing 14, the insulator 23 may be disposed between the binding portion 21 and the housing 14. A surface of the binding portion 21, opposite to the surface contacting the uncoated region 11a, may have the area A that is not covered by the insulator 23. The area (A) may be needed to enable attaching, e.g., welding the binding portion 21 to the uncoated region 11a.

The battery according to the present invention may further include the auxiliary tab 24. The auxiliary tab 24 may be attached to side surface of the uncoated region 11a that is opposite to the surface of the uncoated region 11a attached to the binding portion 21. The auxiliary tab 24 may be disposed between the uncoated region 1a and the container 11. An insulator 25 may be interposed between the auxiliary tab 24 to insulate the container 14 from the opposite side surface of the uncoated region 11a.

The auxiliary tab 24 may have a substantially rectangular and planar shape defined to cover the uncoated region 11a. An area (B) of the surface of the auxiliary tab 24 may not be covered by the insulator 25 and may be used for attaching, e.g., welding, the auxiliary tab 24 to the uncoated region 11a. However, in order to maintain electrical isolation between the container 14 and the auxiliary tab 24, the remaining area, except for the area (B), may be covered with the insulator 25. The insulator 25 may be coated on the surface and/or sides of auxiliary tab 24 or may be a separate insulating member attached to the auxiliary tab 24.

In the battery according to the present invention illustrated in FIGS. 1-3, the binding portion 21 of the tab 20 may attached to the side surface of the uncoated region 11a of the electrode assembly 10 by, e.g., welding, and the integrally formed terminal 32 at the end of the tab 20 may extend to the exterior of the battery through the terminal hole 34 of the cap plate 31. The binding portion 21 of the tab 20 and the auxiliary tab 24 may be formed to be bigger than the flat surface of the uncoated region 11a, so that they sufficiently cover both side surfaces of the uncoated region 11a, thereby preventing electrical contact between the uncoated region 11a and the container 14. The tab 20 and the auxiliary tab 24 may be welded to the opposing surfaces of the uncoated region 11a through the areas (A) and (B), respectively, which are left uncovered by the insulators 23 and 25. The areas (A) and (B) may be formed in the middle of each of the binding portion 21 of the tab 20 and the auxiliary tab 24, respectively.

Figure 4:
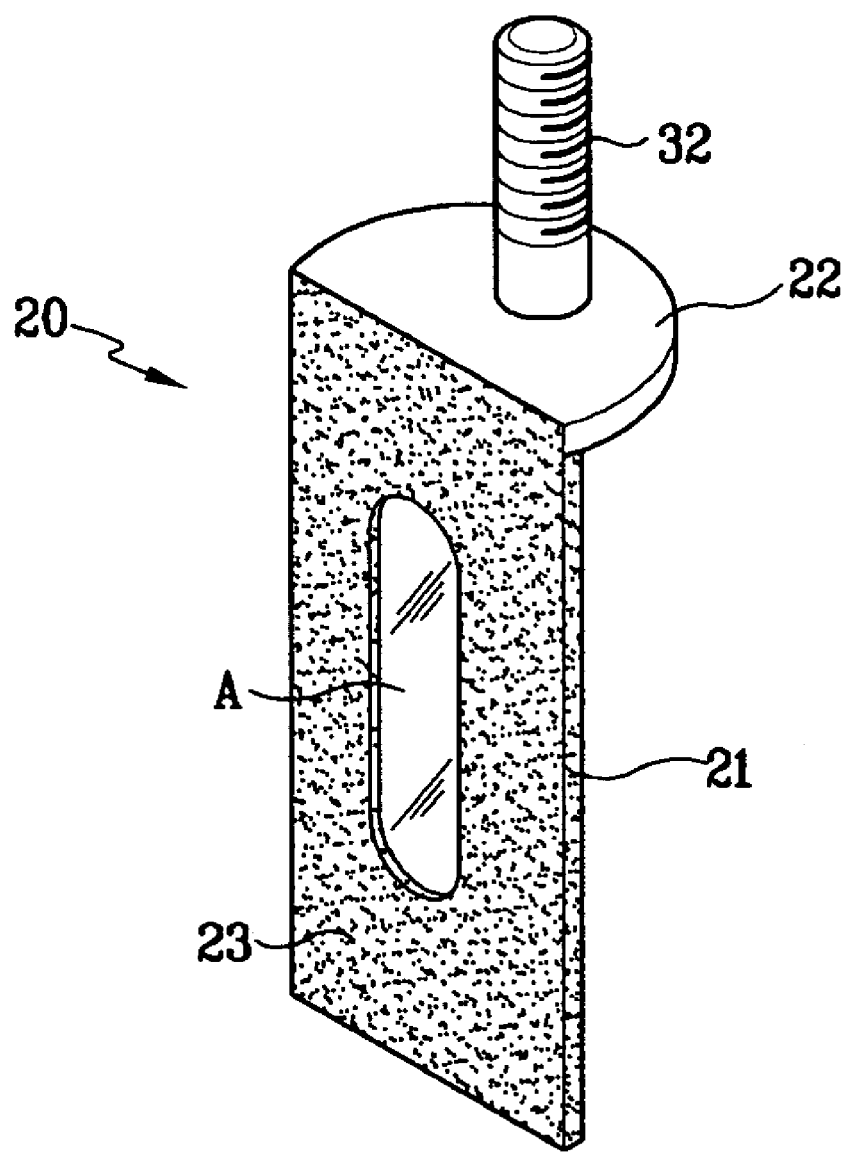
FIG. 4 illustrates a perspective view of a tab according to an embodiment of the present invention.

FIG. 4 illustrates a perspective view of a tab according to an embodiment of the present invention. Referring to FIG. 4, the tab 20 includes the binding portion 21, which may be welded to the side surface of the uncoated region 11a, and the connecting portion 22 integrally formed with the binding portion 21, to collect the current transferred to the binding portion 21 from the uncoated region 11a. The terminal 32 may be integrally formed on the upper end of the connecting portion 21.

An outer surface of the binding portion 21 of the tab, i.e., except for the area (A) that is provided for attaching the binding portion 21 to the uncoated region 11a, may have the insulator 23 coated thereon. That is, the insulator 23 may be an insulative coating applied to a predetermined thickness on the outer surface of the binding portion 21. Further, the insulator 23 may be coated on not only the outer surface of the binding portion 21, but also on the edges and corners of the tab 20, so as to completely insulate the tab 20 from the container 14. Thus, when electrode assembly 10 and the tab 20 are housed in the container 14, the insulator 23 coated on the binding portion 21 of the tab 20 may be interposed between the tab 20 and the container 14 to thereby prevent the tab 20 from electrically connecting to the container 14.

Additionally, although the area (A) is not coated with the insulator 23, the area (A) is spaced apart from the inner surface of the container 14 by the thickness of the insulator 23, so that there is no danger of the uncovered area (A) of the binding portion 21 coming into contact with the container 14.

Figure 5:
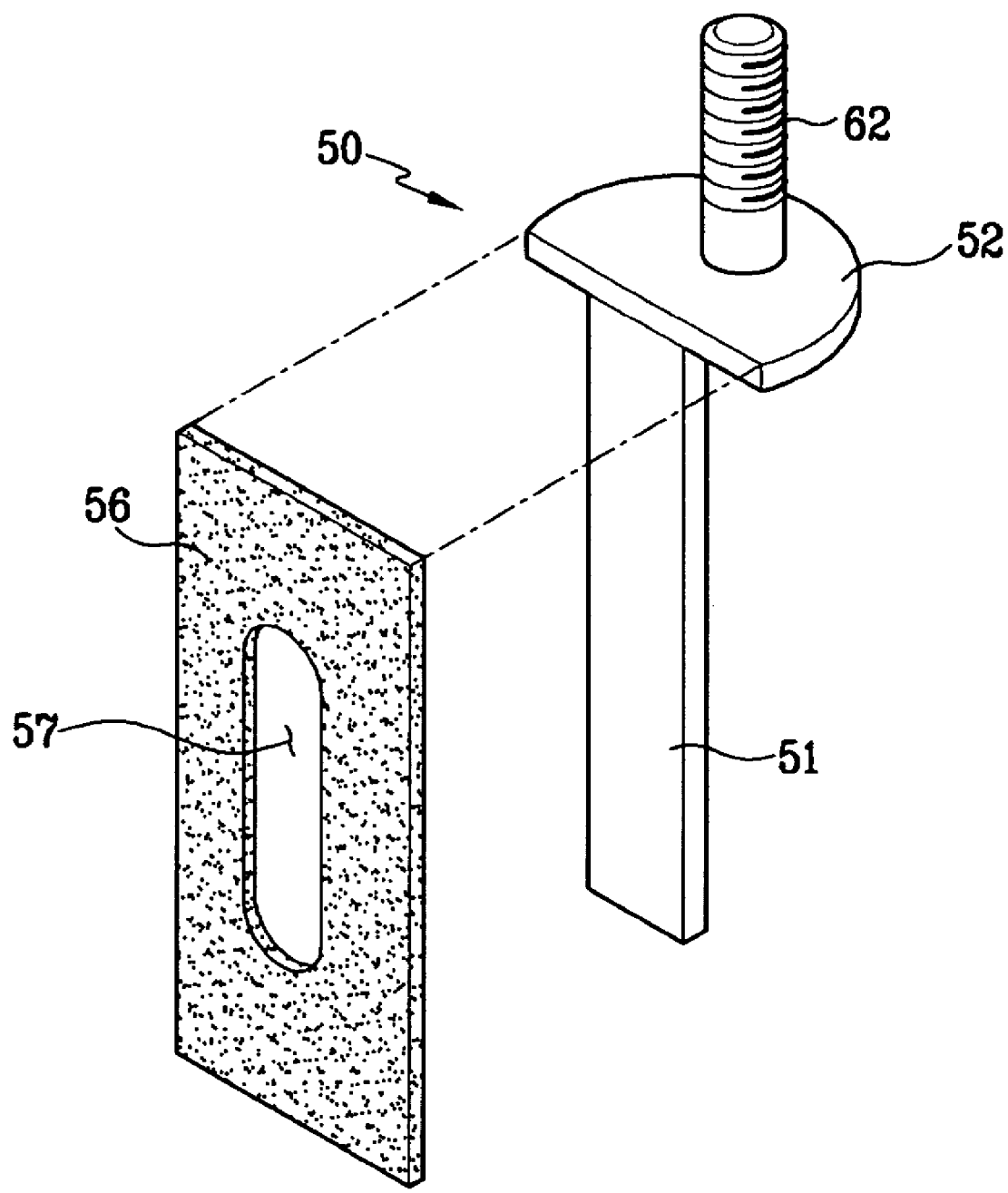
FIG. 5 illustrates a perspective view of a tab according to another embodiment of the present invention.
Figure 6:
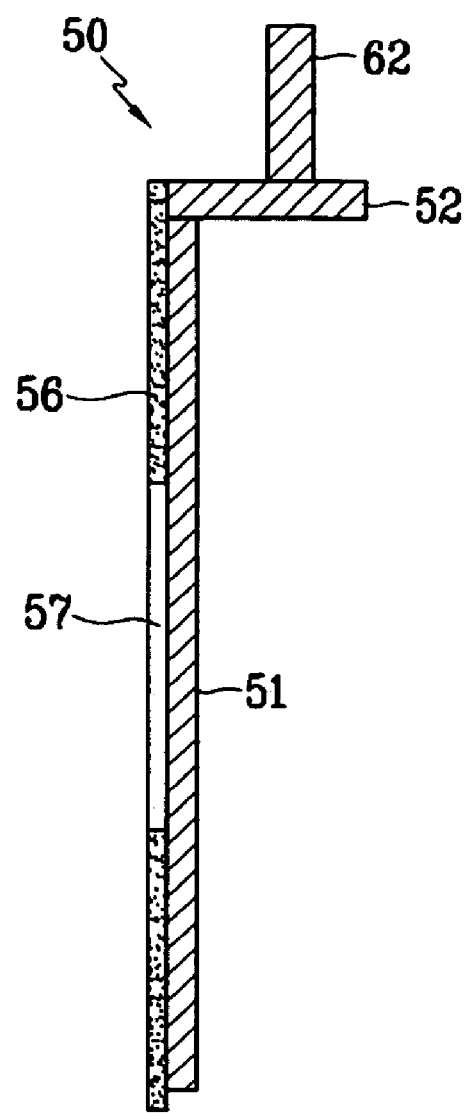
FIG. 6 illustrates a cross-sectional side view of the tab illustrated in FIG. 5.

FIG. 5 illustrates a perspective view of a tab according to another embodiment of the present invention, and FIG. 6 illustrates a cross-sectional side view of the tab illustrated in FIG. 5. Referring to FIGS. 5 and 6, a tab 50 may be mounted to the uncoated regions 11a, 12a, of the electrode assembly 10. The tab 50 may include a binding portion 51 for attaching to the uncoated regions, and a connecting portion 52 integrally connected to the binding region 51, the connecting portion 52 having a terminal 62 at its upper end. An insulating member 56 may be separately formed and attached to an outer side surface of the binding portion 51. The insulating member 56 may cover the binding portion 51 and insulate it and the tab 50 from the container 14. The insulating member 56 may be attached to the binding portion by, e.g., an adhesive, etc.

The insulating member 56 may be interposed between the container 14 and the binding portion 51 of the tab 50 to insulate the tab 50 from the container 14. The insulating member 56 may a size sufficient to cover the binding portion 51, and may have a hole 57 formed therein, to allow for attaching, e.g., welding, the binding portion 51 to the uncoated regions of the electrode assembly. The hole 57 may be formed in the middle of the insulating member 56. After the tab 50, having the insulating member 56 attached thereto, is disposed adjacent to either of the uncoated region 11a, 12a, the binding portion 51 of the tab may be easily welded through the hole 57 formed in the insulating member 56.

Of course, the tab 50 according to the present invention may be used not only for the positive electrode (uncoated region 11a), but also for the negative electrode (uncoated region 12a).

Figure 7:
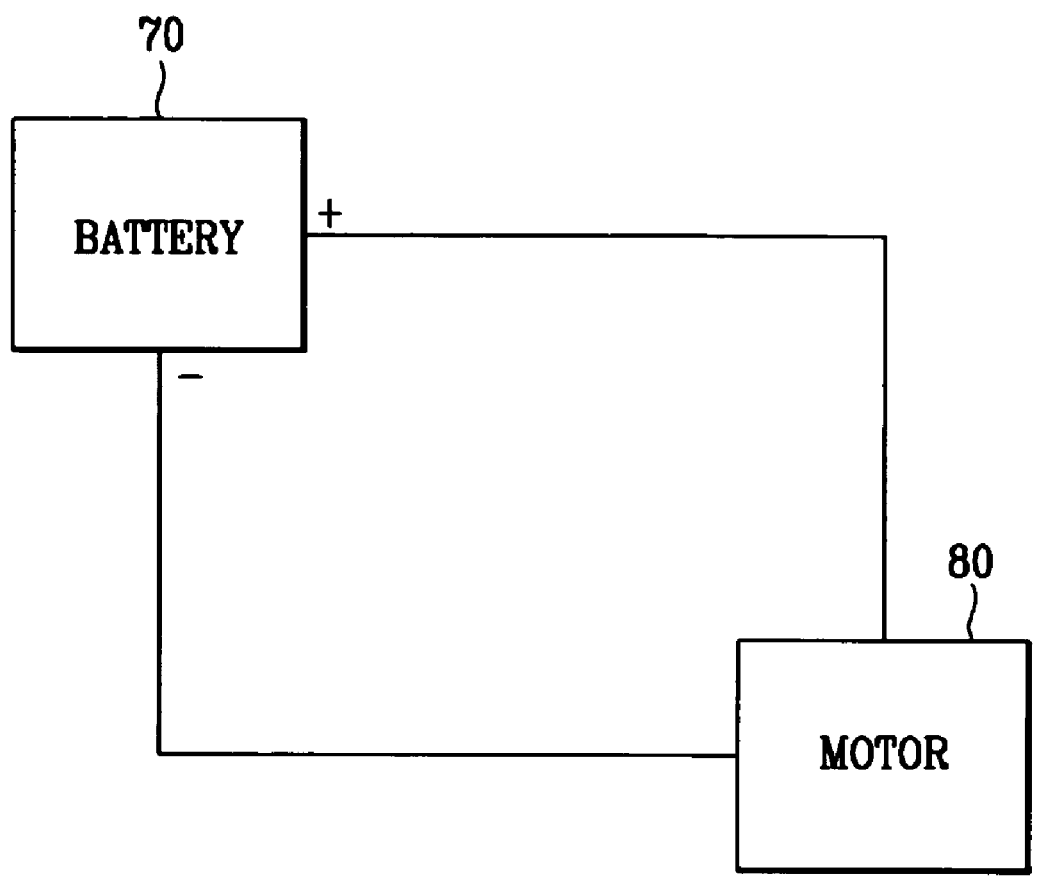
FIG. 7 is a block diagram schematically illustrating an example in which the battery according to the present invention is used for a driving motor.

FIG. 7 is a block diagram schematically illustrating an example in which the battery according to the present invention is used for a driving motor. As illustrated, the positive terminal and the negative terminal of the battery 70 are connected to the motor 80, respectively, to be used for driving the motor 80.

Batteries according to the present invention may be secondary batteries and may be used as the power source for motor driven devices, e.g., hybrid electric vehicles, electric vehicles, wireless vacuum cleaners, motorbikes, motor scooters, etc. Although the above description focuses largely on the tab 20 and the positive electrode side of the battery, this is done simply for clarity and the structures and features of the tab disposed on the negative electrode side of the battery may be identical. Accordingly, it will be appreciated that the present invention encompasses batteries having the described structures at one or both electrodes.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery, comprising:
   an electrode assembly including a positive electrode, a negative electrode and a separator interposed between the electrodes, the electrode assembly including a winding of the positive electrode, the negative electrode and the separator wound about a winding axis, the separator electrically insulating the positive electrode from the negative electrode;
   a conductive container housing the electrode assembly, the container having a first wall disposed proximate to a first side of the winding, having a second wall disposed proximate to a second side of the winding, and having a third wall facing a first end of the winding such that the winding axis is normal to the third wall, the third wall joining the first and second walls;
   a tab attached to a first uncoated region on the first side of the winding, the tab holding the winding in a position that is spaced apart from the first wall, the tab having a terminal that is electrically connected to the first uncoated region;
   a first insulator interposed between the tab and an inner surface of the first wall, the first insulator electrically insulating the tab from the inner surface of the first wall; and
   a cap assembly closing the container and having the terminal passing therethrough.

2. The battery as claimed in claim 1, wherein the first insulator is a coating applied to a surface of the tab that faces the inner surface of the first wall.

3. The battery as claimed in claim 2, wherein the first insulator is also coated on a side surface of the tab.

4. The battery as claimed in claim 2, wherein the first insulator is not coated on a portion of the surface of the tab that faces the inner surface of the first wall, such that the portion of the surface of the tab is exposed.

5. The battery as claimed in claim 4, wherein the first uncoated region of the winding and the tab are welded together, the weld corresponding to the exposed portion of the tab.

6. The battery as claimed in claim 4, wherein the exposed portion of the tab has a long shaft like shape along the length direction of the tab.

7. The battery as claimed in claim 1, wherein the first insulator is made of polymer or polypropylene.

8. The battery as claimed in claim 1, wherein the first insulator is a separate member that is attached to a surface of the tab that faces the inner surface of the first wall.

9. The battery as claimed in claim 8, wherein the tab includes a binding portion, and wherein the first insulator has a width that is larger than a width of the binding portion.

10. The battery as claimed in claim 8, wherein the first insulator has a substantially planar shape and has an opening to expose a portion of the surface of the tab.

11. The battery as claimed in claim 10, wherein the opening has a long shaft like shape along the length direction of the tab.

12. The battery as claimed in claim 9, wherein the first uncoated region of the winding and the tab are welded together, the weld corresponding to the portion of the tab exposed through the opening in the first insulator.

13. The battery as claimed in claim 1, further comprising:
   an auxiliary tab on an opposite side of the winding from the first uncoated region; and
   a second insulator interposed between the auxiliary tab and an inner surface of the second wall, wherein:
   the auxiliary tab is attached to a second uncoated region of the winding, and
   the first uncoated region and the second uncoated region of the winding correspond to a same electrode of the winding.

14. The battery as claimed in claim 13, wherein:
   the battery includes, in sequence, the first wall, the first insulator, the tab, the winding, the auxiliary tab, the second insulator, and the second wall.

15. The battery as claimed in claim 13, wherein the second insulator is a coating applied to a surface of the auxiliary tab that faces the inner surface of the second wall.

16. The battery as claimed in claim 15, wherein the second insulator is also coated on a side surface of the auxiliary tab.

17. The battery as claimed in claim 15, wherein the second insulator is not coated on a portion of the surface of the auxiliary tab that faces the inner surface of the second wall, such that a portion of the surface of the auxiliary tab is exposed.

18. The battery as claimed in claim 17, wherein the second uncoated region of the winding and the auxiliary tab are welded together, the weld corresponding to the exposed portion of the auxiliary tab.

19. The battery as claimed in claim 13, wherein the second insulator is a separate member attached to the surface of the auxiliary tab that faces the inner surface of the second wall.

20. The battery as claimed in claim 19, wherein the second insulator has a substantially planar shape and has an opening to expose a portion of the surface of the auxiliary tab.

21. The battery as claimed in claim 20, wherein the opening has a long shaft like shape along the length direction of the auxiliary tab.

22. The battery as claimed in claim 20, wherein the second uncoated region of the winding and the auxiliary tab are welded through the surface of the auxiliary tab exposed through the opening of the insulator.

23. The battery as claimed in claim 1, wherein the tab covers the entire area of the first uncoated region of the winding.

24. The battery as claimed in claim 1, wherein the battery is a secondary prismatic type battery.

25. The battery as claimed in claim 1, wherein the battery is for a motor driven device.

26. A battery, comprising:
an electrode assembly including a positive electrode, a negative electrode and a separator interposed between the electrodes;
a container housing the electrode assembly;
a tab attached to a first side of an uncoated region of the electrode assembly, the tab having a terminal;
a first insulator interposed between the tab and a first inner surface of the container;
a cap assembly closing the container and having the terminal passing therethrough;
an auxiliary tab, wherein the auxiliary tab is attached to a second side of the uncoated region, opposite the first side, the first side of the uncoated region and the second side of the uncoated region corresponding to a same electrode of the winding; and
a second insulator interposed between the auxiliary tab and a second inner surface of the container, wherein:
the battery includes, in sequence, the first inner surface of the container, the first insulator, the tab, the electrode assembly, the auxiliary tab, the second insulator, and the second inner surface of the container.

* * * * *